(12) United States Patent
Chai et al.

(10) Patent No.: US 8,191,058 B2
(45) Date of Patent: May 29, 2012

(54) COMPUTER PROCESSING SYSTEM FOR REALIZING DATA UPGRADE AND A DATA UPGRADING METHOD

(75) Inventors: Hongfeng Chai, Shanghai (CN); Yuemin Qi, Shanghai (CN); Rui Guo, Shanghai (CN); Shuo He, Shanghai (CN); Wenbin Hu, Shanghai (CN)

(73) Assignee: China Unionpay, Shanghai (CN)

( * ) Notice: Subject to any disclaimer, the term of this patent is extended or adjusted under 35 U.S.C. 154(b) by 1219 days.

(21) Appl. No.: 11/921,034

(22) PCT Filed: May 24, 2006

(86) PCT No.: PCT/CN2006/001084
§ 371 (c)(1),
(2), (4) Date: Nov. 26, 2007

(87) PCT Pub. No.: WO2006/125392
PCT Pub. Date: Nov. 30, 2006

(65) Prior Publication Data
US 2009/0234906 A1    Sep. 17, 2009

(30) Foreign Application Priority Data

May 24, 2005    (CN) .......................... 2005 1 0072008

(51) Int. Cl.
*G06F 9/445* (2006.01)
*G06F 15/16* (2006.01)
(52) U.S. Cl. ........ 717/172; 717/168; 717/171; 717/173; 709/203; 709/220
(58) Field of Classification Search .................... None
See application file for complete search history.

(56) References Cited

U.S. PATENT DOCUMENTS

| 5,852,715 | A  | * | 12/1998 | Raz et al. ........................ 709/201 |
| 5,991,760 | A  | * | 11/1999 | Gauvin et al. ........................ 1/1 |
| 6,389,129 | B1 | * | 5/2002  | Cowan ..................... 379/221.03 |
| 6,883,020 | B1 | * | 4/2005  | Taranto et al. ................ 709/213 |
| 6,976,079 | B1 | * | 12/2005 | Ferguson et al. ............. 709/229 |
| 7,519,964 | B1 | * | 4/2009  | Islam et al. ................... 717/177 |

(Continued)

FOREIGN PATENT DOCUMENTS

CN    1501274 A    6/2004

(Continued)

*Primary Examiner* — Isaac Tecklu
(74) *Attorney, Agent, or Firm* — Frommer Lawrence & Haug LLP; Ronald R. Santucci

(57) ABSTRACT

A computer processing system for implementing data upgrade includes a communication interface device, at least two application servers and a database server for storing data, wherein the communication interface device detects in real-time a connection state of the communication interface device and each of the application servers, and sends data received from external to an application server connected with itself for processing; all the application servers are connected with the database server to process data and store the processed data in the database server, the data upgrade is implemented in batch for the application servers requiring the data upgrade by disconnecting the application servers from the communication interface device and reestablishing the connection of the application servers with the communication interface device after the data upgrade is completed. During the data upgrade, upgrade may be implemented without shut-down of the system. Most importantly, all the servers available in the system always work at the same time and share the burden in switching, thus improving the working efficiency of the whole system.

18 Claims, 3 Drawing Sheets

U.S. PATENT DOCUMENTS

| | | | |
|---|---|---|---|
| 7,650,432 B2 * | 1/2010 | Bosworth et al. | 709/248 |
| 7,685,253 B1 * | 3/2010 | Valia | 709/217 |
| 2003/0237081 A1 | 12/2003 | Taylor | |
| 2004/0019823 A1 | 1/2004 | Gere | |
| 2005/0033822 A1 * | 2/2005 | Grayson et al. | 709/217 |
| 2006/0010123 A1 * | 1/2006 | Sonkin et al. | 707/4 |
| 2006/0069753 A1 * | 3/2006 | Hu et al. | 709/220 |
| 2006/0070056 A1 * | 3/2006 | Watson et al. | 717/168 |
| 2006/0184927 A1 * | 8/2006 | Deblaquiere et al. | 717/168 |
| 2007/0244999 A1 * | 10/2007 | Hamanaka et al. | 709/220 |
| 2010/0251230 A1 * | 9/2010 | O'Farrell et al. | 717/173 |

FOREIGN PATENT DOCUMENTS

| | | |
|---|---|---|
| WO | WO 03/107147 | 12/2003 |

* cited by examiner

RELATED ART

COMPUTER PROCESSING SYSTEM FOR REALIZING DATA UPGRADE AND A DATA UPGRADING METHOD

FIELD OF THE INVENTION

This application is a 371 of PCT/CN2006/001084 filed on May 24, 2006, published on Nov. 30, 2006 under publication number WO2006/125392 which claims priority benefits from Chinese Patent Application Number 200510072008.X filed May 24, 2005, the disclosure of which is hereby incorporated by reference.

BACKGROUND OF THE INVENTION

Having high speed data processing capabilities and large storage capacities, computers have been widely used in various fields of production and living, such as communications, traffic and banking. Many computers need to be in a continuously working state to ensure normal operation of the whole system. For example, once a switch server in a telecommunication department shuts down, many user terminals will not be able to communicate with one another. Once an information processing system of a bank card organization shuts down, a large number of card holders and merchants will not be able to deal with the bank card businesses, causing inconvenience to the users.

However, with the continuous development of the computer technologies and the constant changes in the application environment, data upgrade needs to be implemented for various servers within a computer system to add new functions in a timely way.

A method for upgrading data in the prior art will be described on the basis of specific hardware. Referring to FIG. 1, there is shown a schematic diagram illustrating the architecture of a prior art computer processing system, which includes a communication interface device 11, a main application server 12 and a standby server 13. The communication interface device 11 may be such a computer device as a router and a switch, which is used to establish a secure connection between the computer system and an external device/external network/external system. The main application server 12 connects the communication interface device 11 and the standby server 13.

The main purpose of such a redundant main-standby design is to ensure the security of the system. Besides, the above computer processing system is also used to upgrade software of the application server in the prior art.

The method for upgrading data includes: upgrading the software on the standby server 13; performing main-standby switching to put the standby server into a working state; upgrading the software of the main application server 12; updating data of the main application server 12 according to that of the standby server 13; and performing main-standby switching again to put the main application server 12 into a working state.

Although being able to implement upgrade without shut-down, this method for upgrading data has the following disadvantages.

First, the whole computer processing system usually includes a number of application servers each provided with a standby server 13. All the standby servers 13 are in a standby state and will actually work only upon software upgrade or a failure of the main application servers, causing great waste of the server resources.

In addition, the standby server 13 needs to be updated periodically to ensure consistence of the data thereon with that on the application server and thus occupies the CPU resources of the application server periodically to update the resources of the standby server 13, resulting in an increased processing burden on the application server.

SUMMARY OF THE INVENTION

An object of the invention is to provide a method for upgrading data and a computer processing system for implementing data upgrade, thereby solving the problem of great waste of server resources arising from upgrading without shut-down using the main-standby architecture of a computer processing system in the prior art.

To solve the above problem, the invention provides a computer processing system for implementing data upgrade, including a communication interface device, at least two application servers and a database server for storing data, wherein the communication interface device is adapted to send data received from external to an application server connected therewith for processing, and return a result of processing to an external device/external network; and all the at least two application servers are connected with the database server to process data and store the processed data in the database server, wherein the data upgrade is implemented in batch for the application servers requiring the data upgrade by disconnecting the application servers from the communication interface device and reestablishing the connection of the application servers with the communication interface device after the data upgrade is completed.

Preferably, the communication interface device is also adapted to detect in real-time a connection state of the communication interface device with each of the at least two application servers, and implement communications with the application server according to the connection state.

The communication interface device is a number of communication servers each connected with all the at least two application servers. The communication interface device includes a switch, a hub or another network interface device.

The communication interface device includes at least a detection unit for detecting in real-time a connection state of the communication interface device with each of the at least two application servers; and a load distribution unit connected with the detection unit, for sending the data received from external evenly to an application server connected therewith currently for processing, and returning a result of processing by the system to a corresponding external device/external network.

The load distribution unit may be implemented by load equalization software or a load equalizer.

The invention further provides a computer processing system for implementing data upgrade, including a communication interface device, at least two types of application servers and a database server for storing data, wherein each of the at least two types of application servers includes at least two application servers, and the communication interface device is adapted to determine the type of data received from external, send the data to an application server of a type corresponding to the type of the data for processing, and return a result of processing to an external device/external network; and all the application servers are connected with the database server to process data and store the processed data in the database server, wherein the data upgrade is implemented in batch for the application servers requiring the data upgrade by disconnecting the application servers from the communication interface device and reestablishing the connection of the application servers with the communication interface device after the data upgrade is completed, and during the data upgrade, at least one application server in each type of application servers is connected with the communication interface device. The communication interface device includes a communication server, a switch, a hub or another network interface device that has a function of load equalization.

Preferably, the communication interface device is also adapted to detect in real-time a connection state of the communication interface device with each of the application servers.

The communication interface device includes at least a detection unit for detecting in real-time a connection state of the communication interface device with each of the application servers; a type determination unit for determining the type of the data received from external to determine the type of application servers for processing the data; and a load distribution unit connected with the detection unit and the type determination unit, for sending the data of the determined type evenly to an application server of a type corresponding to the type of the data and connected therewith currently for processing, and returning a result of processing by the system to a corresponding external device/external network.

The invention further provides a method for upgrading data in a computer processing system, the computer processing system including a communication interface device, at least two application servers and a database server for storing data, wherein the communication interface device is adapted to detect in real-time a connection state of the communication interface device with each of the at least two application servers, and according to the connection state, send data received from external to an application server connected therewith currently for processing; and all the at least two application servers are connected with the database server to process data and store the processed data in the database server, the method including: 1) batching the application servers requiring data upgrade; and 2) implementing the data upgrade for each batch of application servers separately by disconnecting the application servers from the communication interface device, upgrading data on the application servers, and reestablishing connection between the batch of application servers and the communication interface device.

The method further includes: pre-establishing a connection state storing table by the communication interface device for storing a connection state of the communication interface device with each of the at least two application servers; each time the communication interface device detects a connection state of the communication interface device with each of the at least two application servers, updating the connection state storing table; and before sending data received from external to an application server, accessing the connection state storing table by the communication interface device to be aware of all the application servers connected therewith. The communication interface device sends the data received from external evenly to the application servers connected therewith currently for processing.

The invention further provides a method for upgrading data in a computer processing system, the computer processing system including a communication interface device, at least two types of application servers and a database server for storing data, wherein each of the at least two types of application servers includes at least two application servers, and the communication interface device is adapted to determine the type of data received from external, and send the data to an application server of a type corresponding to the type of the data for processing; and all the application servers are connected with the database server to process data and store the processed data in the database server, the method including:

1) batching the application servers requiring data upgrade such that in each batch of application servers, there is at least one application server in each type of application servers that is connected with the communication interface device; and 2) implementing data upgrade for each batch of application servers separately by disconnecting the application servers from the communication interface device, upgrading data on the application servers, and reestablishing connection between the batch of application servers and the communication interface device.

The method further includes:

pre-establishing a connection state storing table by the communication interface device for storing a connection state of the communication interface device with each of the application servers;

each time the communication interface device detects a connection state of the communication interface device with each of the application servers, updating the connection state storing table; and before sending data received from external to an application server, accessing the connection state storing table by the communication interface device to be aware of an application server of the type and connected therewith.

Compared with the prior art, the invention is advantageous in that upgrade may be implemented without shut-down, and most importantly, all the servers available in the system always work at the same time and share the burden in switching, thus improving the working efficiency of the whole system.

DETAILED DESCRIPTION OF THE EMBODIMENTS

The invention will be described in detail with reference to the accompany drawings.

Figure 1:
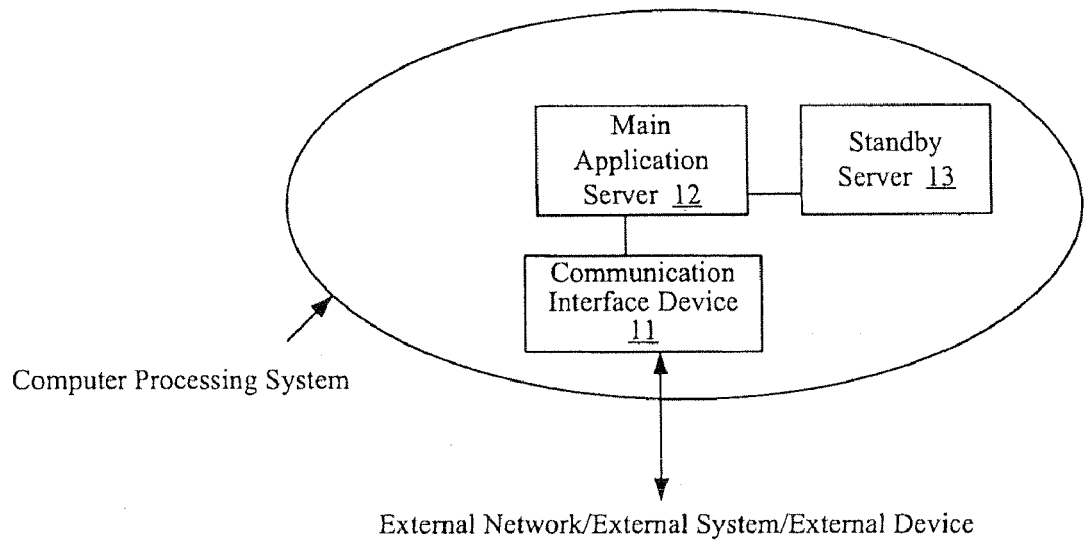
FIG. 1 is a schematic diagram illustrating the architecture of a prior art computer processing system.
Figure 2:
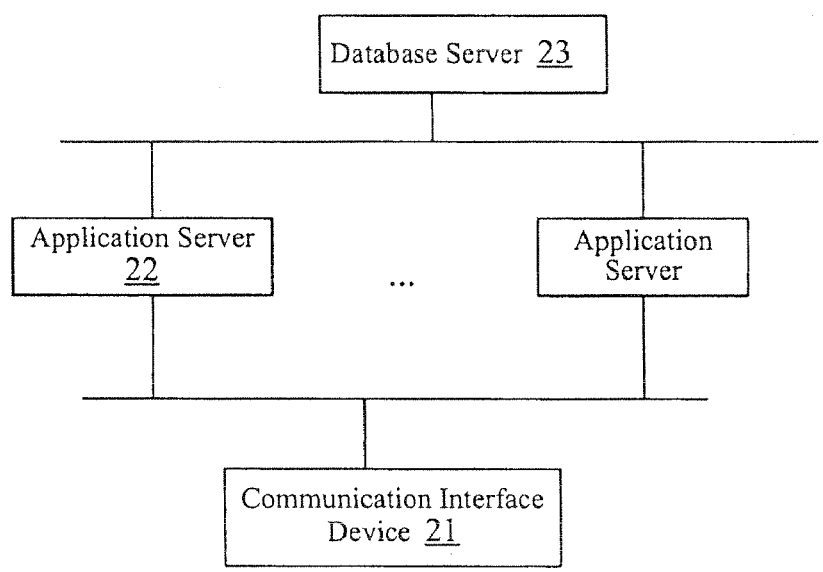
FIG. 2 is a schematic diagram illustrating the architecture of a computer processing system according to the invention.

Referring to FIG. 2, there is shown a schematic diagram illustrating the architecture of a computer processing system for implementing data upgrade according to the invention. The computer processing system includes a communication interface device 21, a number of application servers 22 and a database server 23 for storing data.

The communication interface device 21 is adapted to detect a connection state of the communication interface device 21 with each application server 22, send data received from external to an application server 22 connected therewith currently according to the connection state for processing and return a result of processing to an external device/external network.

The communication interface device 21 is connected with all the application servers, and can send data received from external to an application server 22 connected therewith. In addition, the load equalization technique, as a mature technique in the prior art, is used in the invention, by which the communication interface device 21 distributes the data received from external evenly to the application server 22 connected therewith. The communication interface device 21 may be split into a detection unit and a load distribution unit.

The detection unit is adapted to detect in real-time a connection state of the communication interface device with each of the application servers.

The load distribution unit is connected to the detection unit, and adapted to send the data received from external evenly to an application server connected therewith currently for processing, and return a result of processing by the system to a corresponding external device/external network. The load distribution unit may be implemented by load equalization software or a load equalizer.

The communication interface device 21 that includes a detection unit and a load distribution unit is just a preferred embodiment of the invention. Those skilled in the art should understand that the function of the communication interface device 21 may also be implemented by one or more than two units, instead of only two units, and further description thereof will be omitted here.

Furthermore, the communication interface device 21 may be a communication server, a switch, a hub or another network interface device a function of load equalization.

All the application servers 22 are connected with the database server 23 to process data and store the processed data in the database server 23. Upon data upgrade, the data upgrade is implemented in batch for the application servers 22 requiring the data upgrade: disconnecting the application servers 22 from the communication interface device 21 and reestablishing the connection of the application servers 22 with the communication interface device 21 after the data upgrade is completed.

Since the communication interface device 21 detects in real-time a connection state of the communication interface device 21 with each of the application servers 22, when data upgrade needs to be implemented for the application servers 22, the application servers 22 may be disconnected from the communication interface device 21, and the communication interface device 21 can detect the disconnection of the communication interface device 21 from the application servers 22, and send data received from external evenly to another application server 22 still normally connected therewith for processing. After the data upgrade is completed, the connection of the application servers 22 with the communication interface device 21 is reestablished. Therefore, the communication interface device 21 can detect the connection of the application servers 22 with the communication interface device 21 again and thus send data received from external to the application servers 22.

For the purpose of upgrade without shut-down, it should be ensured for the system that at any time, the application servers of the same type are of no difference among one another and may be replaced with one another. In other words, data processable by an application server 22 should be processable by other application servers 22 of the same type, and the results of processing should be completely identical. Only in this way, the automatic load equalization can function properly during operation. To this end, after having processed the data, each of the application servers 22 does not keep any information for the processing at all, but stores such information in the database server 23 and turns to process the following data.

The previous data information associated therewith that is required in the processing of the following data may be read directly from the database server 23.

Namely, during the process of data upgrade for all the application servers 22 in the system, the whole system may be upgraded without shut-down simply by implementing the data upgrade in batch. In addition, in the computer processing system for implementing data upgrade according to the invention, all the application servers 22 are in a normal working state, thus overcoming the problem in the prior art that many standby servers are standby in the system having a main-standby architecture, and improving the data processing speed and data processing capability of the whole system.

In addition to be applicable to data upgrade, the computer processing system according to the invention also has very high stability. When one of the application servers 22 fails, waste of the server resources due to the redundant design can be avoided simply by disconnecting the application server 22 from the communication interface device 21.

Figure 3:
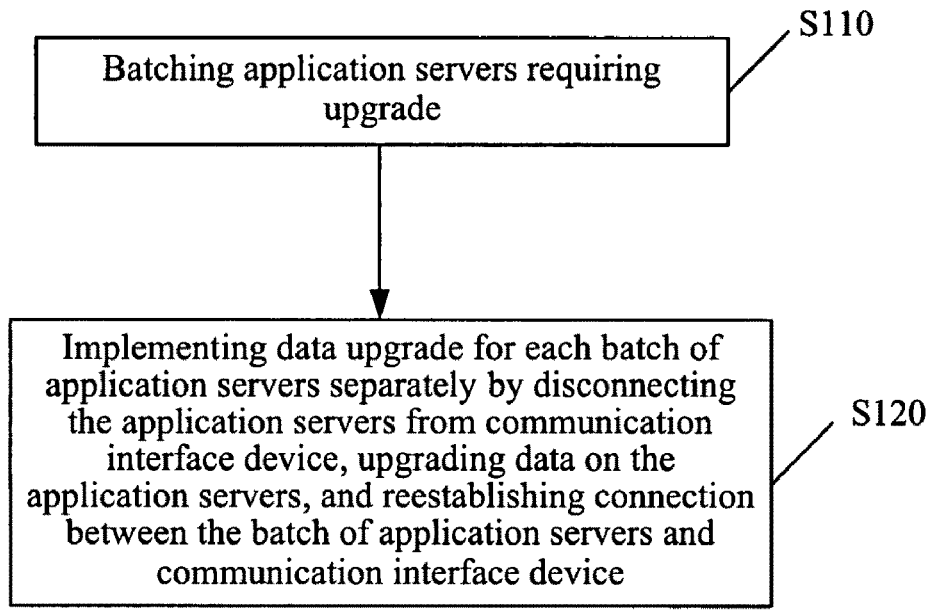
FIG. 3 is a flowchart illustrating a method for upgrading data based on the computer processing system as shown in FIG. 2.

The invention further provides a method for upgrading data based on the above computer processing system. Referring to FIG. 3, there is shown a flowchart of data upgrade according to the invention. The method includes the following steps.

S110: The application servers requiring upgrade are batched.

S120: The data upgrade is implemented for each batch of the application servers separately: the application servers are disconnected from the communication interface device, data on the application servers are upgraded, and the connection between the batch of application servers and the communication interface device is reestablished.

Since the communication interface device 21 detects in real-time a connection state of the communication interface device 21 with each of the application servers 22, when data upgrade needs to be implemented for the application servers 22, the application servers 22 may be disconnected from the communication interface device 21, and the communication interface device 21 can detect the disconnection of the communication interface device 21 from the application servers 22. The communication interface device may detect a connection state of the communication interface device 21 with each of the application servers through a PING command.

Moreover, the communication interface device 21 may pre-establish a connection state storing table for storing a connection state of the communication interface device with each of the application servers 22. Each time detecting a connection state of the communication interface device 21 with each of the application servers 22, the communication interface device 21 updates the connection state storing table. Before sending data received from external to an application server 22, the communication interface device 21 accesses the connection state storing table to be aware of all the application servers 22 connected therewith.

The solution that the communication interface device 21 detects in real-time a connection state of the communication interface device 21 with each of the application servers 22 and sends data according to the connection state is just a preferred embodiment of the invention. Generally, the communication interface device 21 may send data received from external to the application servers 22 directly. When data upgrade needs to be implemented for the application servers 22, the application servers 22 may be disconnected from the communication interface device 21 or the communications therebetween may be broken, such that the communication interface device 21 can not send data to the application servers 22. That is to say, both of the above solutions can achieve the object of the invention. In other words, the communication interface device 21 mainly acts as a communication interface between the communication interface device 21 and the application servers 22, and the real-time detection of the connection state therebetween is just an additional function for a best effect.

During the process of data upgrade for all the application servers 22 in the system, the whole system may be upgraded without shut-down simply by implementing the data upgrade in batch. The term "in batch" means that all the application servers requiring the data upgrade in the system are batched into at least two batches. When a batch of application servers 22 are disconnected from the communication interface device 21, the other batch of application servers 22 continue to process data. After the data upgrade is completed for the first batch of application servers 22, the connection between the first batch of application servers 22 and the communication interface device 21 may be reestablished. Thus, the second batch of application servers 22 may be disconnected from the communication interface device 21, and the data upgrade may be implemented for the second batch of application servers 22. After the data upgrade is completed for the second batch of application servers 22, the connection between the second batch of application servers 22 and the communication interface device 21 may be reestablished. In this way, the data upgrade can be implemented for the whole system. It is to be noted that the application servers 22 requiring data upgrade in the system are not limited to be batched into two batches, but can be batched into three or four batches, or the upgrade may be implemented for the application servers 22 even one by one. The number of the batches may be designed according to the data processing capability of and the data to be processed by the system. Generally speaking, the more the batches are, the less the influence on the data processing capability of the whole system is.

Figure 4:
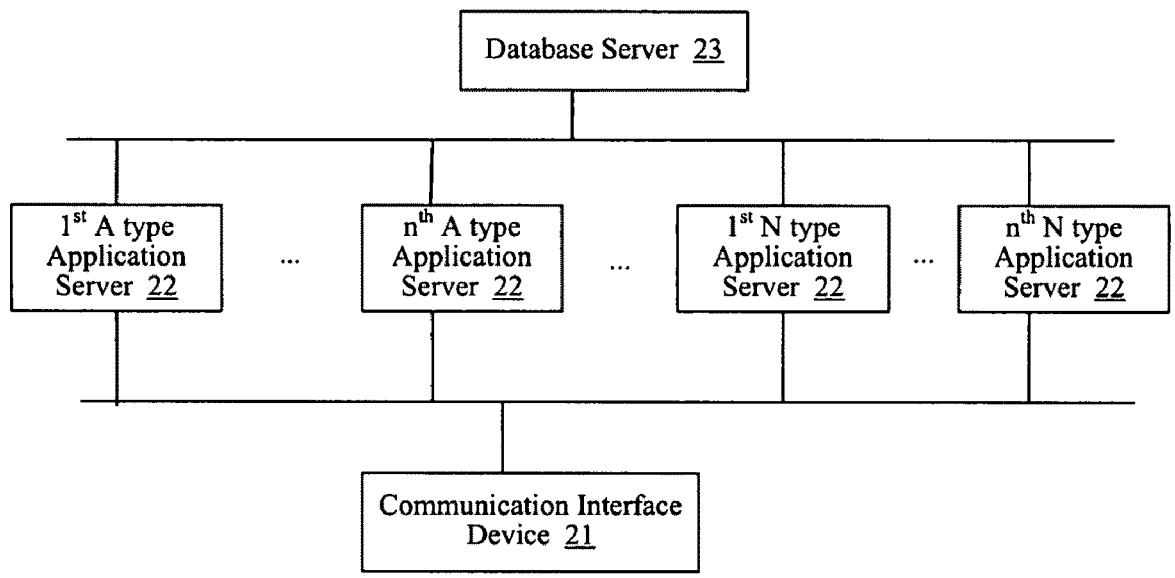
FIG. 4 is a schematic diagram illustrating the architecture of another computer processing system according to the invention.

In practice, the system may be provided with a number of application servers that process different types of data. Application servers that process the same type of data are called the application servers of the same type. Referring to FIG. 4, there is shown a schematic diagram illustrating the architecture of another computer processing system for implementing data upgrade according to the invention. The computer processing system includes a communication interface device 21, a number of application servers 22 and a database server 23 for storing data. The application servers 22 include a first A type application server, a second A type application server, . . . , a N-th A type application server, . . . , a first N type application server, a second N type application server, . . . , a N-th N type application server. Namely, the system has at least two application servers of the same type.

The communication interface device 21 is adapted to detect in real-time a connection state of the communication interface device 21 with each of the application servers. When receiving data from external, the communication interface device 21 determines the type of the data to be processed, then determines an application server in the application servers of the type, which is connected with the communication interface device 21, and sends the data to the application server evenly.

For example, the system has two A type application servers and three B type application servers, and all the five application servers are connected with the communication interface device. In this case, each time receiving data, the communication interface device 21 determines the type of the data to be processed and distributes the data evenly to an application server of a corresponding type. If the data received needs to be processed by a B type application server, the communication interface device sends the data to one of the B type application servers. Here the numbers of times that the communication interface device sends data to the application servers are generally identical. When the application servers requiring data upgrade are batched during the data upgrade for the system, each batch should be taken into account to ensure that there is at least one application server in each type of application servers that is connected with the communication interface device 21.

The communication interface device 21 may be a communication server, a switch, a hub or another network interface device that has a function of load equalization.

Furthermore, the communication interface device 21 includes at least a detection unit for detecting in real-time a connection state of the communication interface device with each of the application servers;

a type determination unit for determining the type of the data received from external to determine the type of application servers for processing the data;

a load distribution unit connected to the detection unit and the type determination unit, for sending the data of the determined type evenly to an application server of a corresponding type and connected therewith currently for processing, and returning a result of processing by the system to a corresponding external device/external network.

The application servers may be classified as required. If the communication interface device 21 is connected with three external systems. The system may be provided accordingly with three types of application servers, and each type of application servers deals with a corresponding external system. In this way, when receiving data, the communication interface device 21 may determine the external system from which the data comes and send the data to an application server in the application servers of a corresponding type for processing. In the invention, the data of the type may be sent evenly to the application server of the corresponding type using the load equalization technique.

Another method for upgrading data provided based on the above computer processing system is similar to the method illustrated in FIG. 3. The differences from the method illustrating in FIG. 3 will be explained in detail below.

1. When the application servers 22 are batched, it should be ensured that upon data upgrade for each batch, there is at least one application server in each type of application servers that is connected with the communication interface device 21.

2. A state storing table may also be established in this method. The communication interface device pre-establishes a connection state storing table for storing a connection state of the communication interface device with each of the at least two application servers. Storage in the state storing table may be implemented according to the type of the application servers. For example, it may be stored that how many application servers in the A type application servers are connected with the communication interface device currently. Then, each time detecting a connection state of the communication interface device with each of the at least two application servers, the communication interface device updates the connection state storing table. Before sending data received from external to an application server, the communication interface device accesses the connection state storing table to be aware of all the application servers of the type and connected therewith, and sends the data to one of them for processing.

A computer processing system and a corresponding method for upgrading data according to the invention will be further described with reference to a specific example.

EXAMPLE

Figure 5:
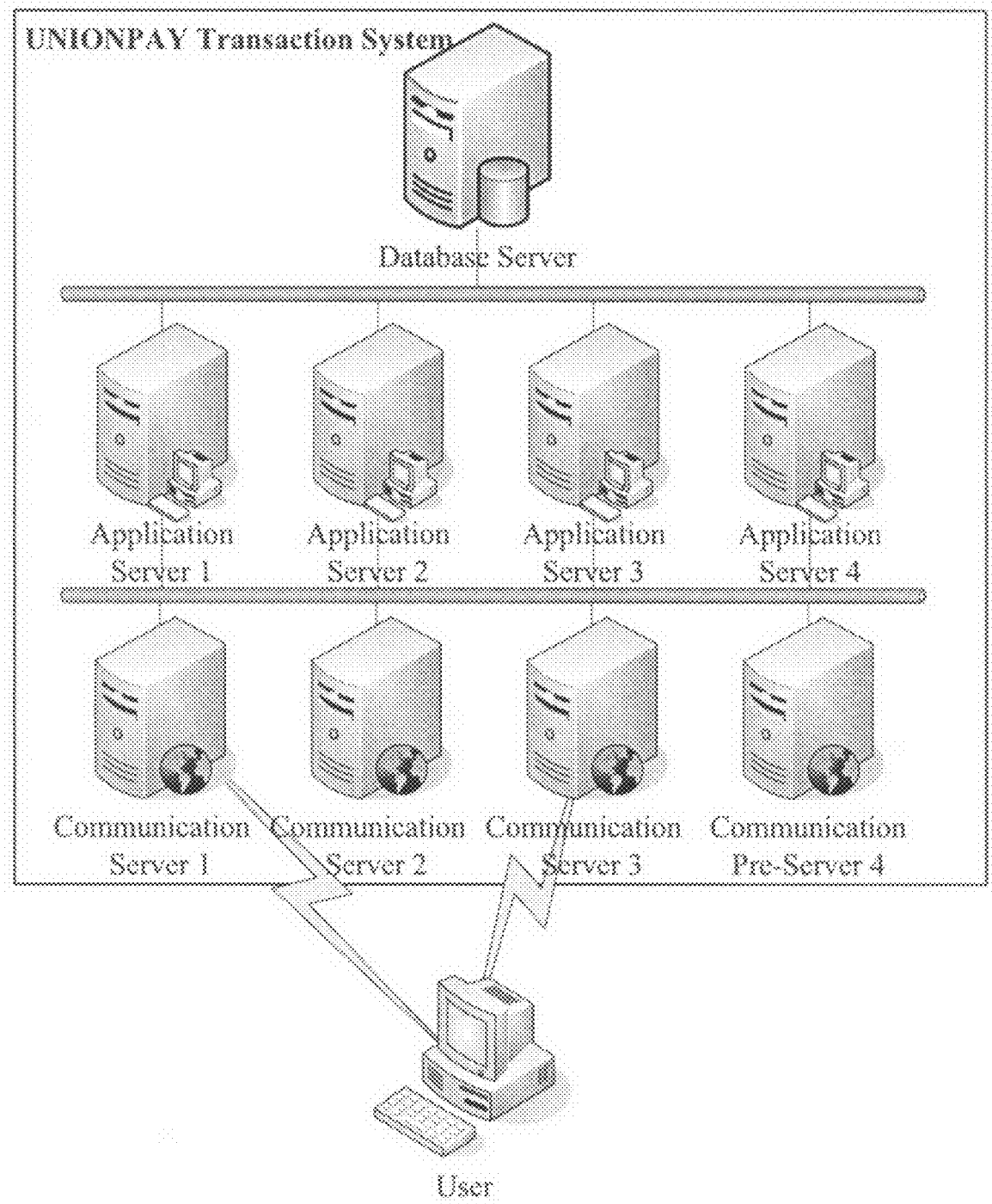
FIG. 5 is a schematic diagram illustrating the architecture of a computer processing system in an example of the invention.

Referring to FIG. 5, there is shown a transaction system of a bank, which has a multi-server multi-layer application system architecture.

An external user (for the UNIONPAY, an agency having accessed to the network) is the initiator of a transaction, which sends transaction data to the UNIONPAY transaction system over the UNIONPAY network for processing.

In the UNIONPAY transaction system, it is a communication server that is connected to external. On the one hand, the transaction request data sent to the UNIONPAY transaction system by the external user is received and transferred to a following application server for processing by the communication server; and on the other hand, a result of transaction processing by the application server is also returned to the external user via the communication server.

What is run on the application server is a core traffic processing logic of the UNIONPAY transaction system, where the transaction request of the user is implemented. In addition, the application server sends information on each transaction to a following database server to store in a database.

The database server performs operations such as addition, modification and query according to instructions from the application server.

In the UNIONPAY transaction system, specially developed transaction software is configured on the communication server and application server. As a result of the rapid growth of the UNIONPAY traffic and the continuous emergence of new services, such specially developed transaction software needs to be updated or upgraded frequently. Here the upgrade without shut-down referred to above means implementing update or upgrade of the transaction software while maintaining the capability of continuously processing transaction requests of users.

To update or upgrade the software on an application server, working of the application server must be stopped. The key lies in how to maintain the normal operation of the whole system when working of one or more servers is stopped. The basic idea of implementing upgrade according to the invention is that when working of a server is stopped, the work to be handled by the application server will be transferred to another server for handle, thereby ensuring that the operation of the whole system would not be broken down. Such an idea can be reflected in methods of designing the architectures of the following systems.

1. Multi-Server Operation

There should be at least two working servers in each type of servers, such that when any one of the servers shuts down, another server always exists for taking over its work.

There are four communication servers and four application severs working at the same time in the UNIONPAY transaction system, which meets the above requirement.

2. Automatic Load Equalization During Operation

The whole system should have a capability of distribute transaction loads according to the health of the servers. When working of a server is stopped, the system should be able to respond in time to transfer the work to be handled by the application server to another server having the same function for handle.

In the UNIONPAY transaction system, because of the differences in the processing functions and methods of distributing transaction loads between the communication servers and application servers, different methods are employed to implement the automatic load equalization for the communication servers and application servers.

a) Each user system should be connected to at least two communication servers of the UNIONPAY transaction system.

b) Normally, a user system should send transaction data evenly to the communication servers connected therewith.

c) Upon detecting disconnection from a communication server, the user system should send transaction data evenly to other communication servers still connected therewith normally.

The above load distribution strategy actually makes it possible for the UNIONPAY transaction system to implement the automatic load equalization at the user side of the communication servers.

The application severs receive the transaction requests from the communication servers and send the results of transactions to the communication servers. Here all the application servers and communication servers are designed to be connected with each other, i.e. any one of the communication servers is connected with all the application servers, and any one of the application servers is connected with all the communication servers, Normally, each of the communication servers sends transaction requests it receives evenly to all the four application servers, and each of the application servers also sends the results of the transactions it handles evenly to those communication servers connected with the user. Upon detecting disconnection of a communication server from an application server, the communication server sends transaction requests it receives evenly to other application servers still connected therewith. Upon detecting disconnection of an application server from a communication server, the application server sends its transaction responses evenly to other communication servers both still connected therewith and connected with the user.

In the UNIONPAY transaction system, only the function of load equalization from the application servers to the communication servers is newly developed, and the function of automatic load equalization included in an intermediate product for transaction (e.g. Tuxedo software from BEA System, Inc.) has been used for the function of load equalization from the communication servers to the application servers.

For the purpose of upgrade without shut-down, it should be ensured for the system that at any time, the application servers of the same type are of no difference among one another and may be replaced with one another. In other words, data processable by an application server 22 should be processable by other application servers 22 of the same type, and the results of processing should be completely identical. Only in this way, the automatic load equalization can function properly during operation.

The design of the UNIONPAY transaction system follows a designing idea of stateless procedures: after having processed a transaction request, a server does not keep any information for the transaction at all, but stores such information in a database and turns to process the next transaction. The information for the previous transaction associated therewith that is required in the processing of the next transaction may be read directly from the database. In this way, a transaction and another transaction associated therewith can be processed on different communication servers and application servers.

1. Upgrade of Communication Server a1. All the four communication servers work normally before the upgrade.

a2. The UNIONPAY transaction system software on communication server 1 is shut down. At this time, external users connected to communication server 1 would detect disconnection of the external users from communication server 1, and send all transaction requests to other communication servers connected therewith normally.

a3. The UNIONPAY transaction system software on communication server 1 is updated.

a4. The UNIONPAY transaction system software on communication server 1 is started. A test is performed to ensure that the external users connected with communication server 1 can detect resuming of normal connection between the external users and communication server 1. The external users will distribute all transaction requests evenly to all the communication servers.

a5. Other communication servers are updated by repeating steps a2-a4.

2. Upgrade of Application Server b1. All the four application servers work normally before the upgrade.

b2. The UNIONPAY transaction system software on application server 1 is shut down. At this time, all the four communication servers would detect disconnection of the communication servers from application server 1, and send all transaction requests to other application servers connected therewith normally for processing.

b3. The UNIONPAY transaction system software on application server 1 is updated.

b4. The UNIONPAY transaction system software on application server 1 is started. At this time, all the communication servers would detect resuming of normal connection between the communication servers and application server 1 and thus distribute transaction requests evenly to the four application servers for processing.

a5. Other application servers are updated by repeating steps b2-b4.

The present invention has been described with reference to several specific embodiments thereof, and however shall not be limited thereto. Any variations conceivable by those skilled in the art would come into the scope of the present invention.

What is claimed is:

1. A computer processing system for implementing data upgrade to application servers, comprising
    a communication interface device,
    a plurality of application servers coupled to the communication interface device, wherein the plurality of application servers are of the same type such that the results of processing of data by any of the plurality of application servers is identical; and
    a database server for storing data,
    wherein the communication interface device is adapted to send data received from external to an application server connected therewith for processing, and return a result of processing to an external device/external network; and
    all the plurality of application servers are connected with the database server to process data and store the processed data in the database server,
    wherein the data upgrade is implemented in batch for particular application servers of the plurality of application servers requiring the data upgrade by disconnecting the particular application servers requiring the data upgrade from the communication interface device, maintaining connection of at least one of the plurality of application servers during the upgrade and reestablishing the connection of the particular application servers with the communication interface device after the data upgrade is completed.

2. The computer processing system for implementing data upgrade according to claim 1, wherein the communication interface device is also adapted to detect in real-time a connection state of the communication interface device with each of the at least two application servers, and implement communications with the application server according to the connection state.

3. The computer processing system for implementing data upgrade according to claim 1, wherein the communication interface device is a number of communication servers each connected with all the at least two application servers.

4. The computer processing system for implementing data upgrade according to claim 1, wherein the communication interface device comprises a switch, a hub or another network interface device.

5. The computer processing system for implementing data upgrade according to claim 2, wherein the communication interface device comprises at least a detection unit for detecting in real-time a connection state of the communication interface device with each of the at least two application servers; and
    a load distribution unit connected with the detection unit, for sending the data received from external evenly to an application server connected therewith currently for processing, and returning a result of processing by the system to a corresponding external device/external network.

6. The computer processing system for implementing data upgrade according to claim 5, wherein the load distribution unit is implemented by load equalization software or a load equalizer.

7. The computer processing system for implementing data upgrade according to claim 2, wherein the communication interface device is a number of communication servers each connected with all the at least two application servers.

8. The computer processing system for implementing data upgrade according to claim 2, wherein the communication interface device comprises a switch, a hub or another network interface device.

9. A computer processing system for implementing data upgrade to application servers, comprising
    a communication interface device,
    a plurality of at least two types of application servers coupled to the communication interface device, wherein the plurality of application servers within each type are such that the results of processing of data by any of the plurality of application servers within each type is identical; and
    a database server for storing data,
    wherein each of the plurality of at least two types of application servers comprises at least two application servers, and the communication interface device is adapted to determine the type of data received from external, send the data to an application server of a type corresponding to the type of the data for processing, and return a result of processing to an external device/external network; and
    all the plurality application servers are connected with the database server to process data and store the processed data in the database server,
    wherein the data upgrade is implemented in batch for particular application servers of each type of the application servers requiring the data upgrade by disconnecting the particular application servers from the communication interface device, maintaining connection of at least one of the plurality of application servers of each type during the upgrade and reestablishing the connection of the particular application servers with the communication interface device after the data upgrade is completed, and during the data upgrade, at least one application server in each type of application servers is connected with the communication interface device.

10. The computer processing system for implementing data upgrade according to claim 9, wherein the communication interface device is also adapted to detect in real-time a connection state of the communication interface device with each of the application servers.

11. The computer processing system for implementing data upgrade according to claim 9, wherein the communication interface device comprises a communication server, a switch, a hub or another network interface device that has a function of load equalization.

12. The computer processing system for implementing data upgrade according to claim 10, wherein the communication interface device comprises at least a detection unit for detecting in real-time a connection state of the communication interface device with each of the application servers;
a type determination unit for determining the type of the data received from external to determine the type of application servers for processing the data; and
a load distribution unit connected with the detection unit and the type determination unit, for sending the data of the determined type evenly to an application server of a type corresponding to the type of the data and connected therewith currently for processing, and returning a result of processing by the system to a corresponding external device/external network.

13. A method for upgrading data in a computer processing system, the computer processing system comprising
a communication interface device,
a plurality of application servers coupled to the communication interface device, wherein the plurality of application servers are of the same type such that the results of processing of data by any of the plurality of application servers is identical; and
a database server for storing data,
wherein the communication interface device is adapted to detect in real-time a connection state of the communication interface device with each of the plurality of application servers, and according to the connection state, send data received from external to an application server connected therewith currently for processing; and
all the plurality of application servers are connected with the database server to process data and store the processed data in the database server, the method comprising:
1) batching particular application servers requiring data upgrade; and
2) implementing the data upgrade for each batch of the particular application servers separately by disconnecting the application servers from the communication interface device, upgrading data on the particular application servers, maintaining connection of at least one of the plurality of application servers during the upgrade, and reestablishing connection between the batch of particular application servers and the communication interface device.

14. The method for upgrading data according to claim 13, further comprising:
pre-establishing a connection state storing table by the communication interface device for storing a connection state of the communication interface device with each of the at least two application servers;
each time the communication interface device detects a connection state of the communication interface device with each of the at least two application servers, updating the connection state storing table; and
before sending data received from external to an application server, accessing the connection state storing table by the communication interface device to be aware of all the application servers connected therewith.

15. The method for upgrading data according to claim 13, further comprising sending, by the communication interface device, the data received from external evenly to the application servers connected therewith currently for processing.

16. The method for upgrading data according to claim 14, further comprising sending, by the communication interface device, the data received from external evenly to the application servers connected therewith currently for processing.

17. A method for upgrading data in a computer processing system, the computer processing system comprising
a plurality of at least two types of application servers coupled to the communication interface device, wherein the plurality of application servers within each type are such that the results of processing of data by any of the plurality of application servers within each type is identical; and
a database server for storing data,
wherein each of the at least two types of application servers comprises at least two application servers, and the communication interface device is adapted to determine the type of data received from external, and send the data to an application server of a type corresponding to the type of the data for processing;
all the application servers are connected with the database server to process data and store the processed data in the database server, the method comprising:
1) batching particular application servers requiring data upgrade such that in each batch of particular application servers, there is at least one application server in each type of application servers that is connected with the communication interface device; and
2) implementing the data upgrade for each batch of the particular application servers separately by disconnecting the application servers from the communication interface device, upgrading data on the particular application servers, maintaining connection of at least one of the plurality of application servers during the upgrade, and reestablishing connection between the batch of particular application servers and the communication interface device.

18. The method for upgrading data according to claim 17, further comprising:
pre-establishing a connection state storing table by the communication interface device for storing a connection state of the communication interface device with each of the application servers;
each time the communication interface device detects a connection state of the communication interface device with each of the application servers, updating the connection state storing table; and
before sending data received from external to an application server, accessing the connection state storing table by the communication interface device to be aware of an application server of the type and connected therewith.

* * * * *